United States Patent [19]
Choi

[11] Patent Number: 5,852,349
[45] Date of Patent: Dec. 22, 1998

[54] DRIVER CIRCUIT APPARATUS FOR DRIVING A THREE-PHASE MOTOR WITH A SINGLE MAGNETO-SENSITIVE DEVICE

[75] Inventor: Nag-Sig Choi, Bucheon, Rep. of Korea

[73] Assignee: Samsung Electronic, Co., Ltd., Suwon, Rep. of Korea

[21] Appl. No.: 738,352

[22] Filed: Oct. 25, 1996

[30] Foreign Application Priority Data

Oct. 25, 1995 [KR] Rep. of Korea .................. 1995 37147

[51] Int. Cl.[6] .................................................. H01R 39/46
[52] U.S. Cl. ........................ 318/439; 318/254; 318/138; 318/798-815
[58] Field of Search .................. 318/254, 138, 318/439, 798–815

[56] References Cited

U.S. PATENT DOCUMENTS

| | | | |
|---|---|---|---|
| 4,074,173 | 2/1978 | Janssen | 318/138 |
| 4,658,190 | 4/1987 | Miyazaki et al. | 318/254 |
| 5,182,500 | 1/1993 | Shimada | 318/254 |
| 5,378,976 | 1/1995 | Inaji et al. | 318/254 X |
| 5,477,099 | 12/1995 | Suganuma | 318/254 X |

Primary Examiner—Karen Masih
Attorney, Agent, or Firm—Marger, Johnson, McCollom, & Stolowitz P.C.

[57] ABSTRACT

An integrated circuit for driving a three-phase motor in response to a single signal of the three-phase signals to be applied to stator coils of the motor. The circuit comprises a first amplifier for amplifying the single signal on the basis of a first inverse phase signal, which is a 180° phase-shifted signal relative to the single signal, and outputting a first amplified phase signal. A first phase shifter receives the first phase signal and generates a second phase signal in response to the first phase signal, the second phase signal having a phase difference of 120° relative to the first phase signal. A second phase shifter receives the first inverse phase signal and generates a second inverse phase signal in response to the first inverse phase signal, the second inverse phase signal having a phase difference of 120° relative to the first inverse phase signal. A second amplifier amplifies the second phase signal on the basis of the second inverse phase signal and outputs a second amplified phase signal which is a 120° phase-shifted signal relative to the first amplified phase signal. Finally, an output control receives the first and second amplified phase signals and produces a third phase signal, having a phase difference of 120° relative to each of the first and the second phase signals, by means of a control logic thereof to output the three-phase signals. This three-phase signal can then be applied to stator coils of the three-phase motor to drive it efficiently.

10 Claims, 1 Drawing Sheet

5,852,349

DRIVER CIRCUIT APPARATUS FOR DRIVING A THREE-PHASE MOTOR WITH A SINGLE MAGNETO-SENSITIVE DEVICE

FIELD OF THE INVENTION

The present invention relates to a driver circuit apparatus for driving a three-phase motor using a single magneto-sensitive element.

BACKGROUND OF THE INVENTION

U.S. Pat. No. 4,074,173 discloses a collectorless three-phase motor, whose driver circuit has two magneto-sensitive elements for energizing the stator coils depending on the rotor position. Each of the magneto-sensitive elements is provided to detect a rotor position in the three-phase motor and selectively apply a current signal to the stator coils depending on the rotor position. Also the magneto-sensitive elements are actually disposed at a right angle to the rotor axis of the motor and at an angle of 120° relative to each other. Accordingly, they produce signals having a phase difference of 120° in angle to each other. Hall devices have been commonly used for such magneto-sensitive elements. Each hall element has two hall electrodes: one of which outputs one of three-phase signals—a U-phase signal, a V-phase signal and a W-phase signal—and the other outputs an inverse phase signal which is a 180° phase-shifted signal relative to the output phase signal. Consequently, the two output signals of one hall element are two mutually 180° phase-shifted signals. A conventional driver circuit for driving a three-phase motor using two hall elements is shown in FIG. 1.

Referring to FIG. 1, the conventional driver circuit has two hall elements 10 and 11 for respectively generating two signals, i.e. U-phase and V-phase signals. A driver IC (integrated circuit) 50 is included for receiving the two signals from the hall elements 10 and 11, producing three-phase signals, and driving a three-phase motor 60 in response to the three-phase signal. Each of the hall elements is connected between two resistors R1 and R2, or R3 and R4, which are connected in series between a power source Vcc and a ground.

The driver IC 50 includes two amplifiers 20 and 23 for amplifying the U-phase and the V-phase signals from the hall elements 10 and 11, respectively; an output control 30 for receiving the amplified phase signals to output three-phase signals (i.e., U-phase, V-phase and W-phase signals) on the basis of the amplified phase signals; and three output amplifiers 40, 41 and 42 for amplifying the three-phase signals respectively to apply the amplified signals to the stator coils of the motor 60.

As shown again in FIG. 1, the U-phase signal from a first hall electrode of hall element 10 is applied to a noninverting terminal of amplifier 20 in driver IC 50. The inverse U-phase signal from a second hall electrode thereof is applied to an inverting terminal of amplifier 20. Similarly, the V-phase signal from a first hall electrode of hall element 11 is applied to a noninverting terminal of amplifier 23 in driver IC 50. The inverse V-phase signal from a second hall electrode thereof is applied to an inverting terminal of amplifier 23. The U-phase and the V-phase signals have a phase difference of 120° relative to each other. When the output control 30 receives the amplified signals from amplifiers 20,23 corresponding to two of the three-phase signals, it generates the third of the three-phase signals. The three-phase signals are then selectively applied to the stator coils of motor 60 through output amplifiers 40, 41 and 42, respectively.

Since the above described circuit for driving a three-phase motor has two hall devices, each device must be placed exactly 120° from each other to a high degree of precision. If the hall devices are not placed 120° from each other, the third signal, produced by receiving and amplifying the two signals and having a 120° phase shift relative to the two other signals, will not be accurately phased to effectively drive the motor.

Accordingly, the need arises for a driver circuit apparatus which simplifies the production of an accurate three-phase signal.

SUMMARY OF THE INVENTION

It is therefore an object of the present invention to provide a driver circuit apparatus in which a single hall device is employed so as to improve reliability of a three-phase motor and the production rate thereof.

According to an aspect of the present invention, a driver circuit apparatus is provided to drive a three-phase motor depending on three-phase signals to be applied to stator coils of the motor. The apparatus comprises a single magneto-sensitive element for generating a first phase signal of the three-phase signals and a first inverse phase signal which is a 180° phase-shifted signal relative to the first phase signal. An integrated circuit selectively applies a current signal to the stator coils in response to the signals generated from the single magneto-sensitive element. The circuit comprises a first amplifier for amplifying the first phase signal to output a first amplified phase signal, a first phase shifter for receiving the first phase signal and generating a second phase signal having a phase difference of 120° relative to the first phase signal, and a second phase shifter for receiving the first inverse phase signal and generating a second inverse phase signal having a phase difference of 120° relative to the first inverse phase signal. The circuit further includes a second amplifier for amplifying the second phase signal to output a second amplified phase signal, and an output control circuit for producing a third phase signal in response to the first and the second amplified phase signals using control logic to produce the three-phase signal. The third phase signal has a phase difference of 120° relative to each of the first and the second phase signals.

In the driver circuit apparatus, the magneto-sensitive element comprises a hall device and outputs the first phase signal as a U-phase signal.

Preferably, the driver circuit apparatus further comprises an amplifier for amplifying the first, second and the third phase signals, respectively, to be applied to the stator coils.

Another aspect of the present invention provides an integrated circuit for driving a three-phase motor in response to a single signal of the three-phase signals to be applied to stator coils of the motor. The circuit comprises a first amplifier for amplifying the single signal as a first phase signal on the basis of a first inverse phase signal, where the first inverse phase signal is a 180° phase-shifted signal relative to the single signal. A first amplified phase signal is then outputted from the first amplifier. A first phase shifter generates a second phase signal in response to the first phase signal, whereby the second phase signal has a phase difference of 120° relative to the first phase signal. A second phase shifter generates a second inverse phase signal in response to the first inverse phase signal, whereby the second inverse phase signal has a phase difference of 120° relative to the first inverse phase signal. A second amplifier amplifies the second phase signal on the basis of the second inverse phase signal to output a second amplified phase signal which is a 120° phase-shifted signal relative to the first amplified phase signal. An output control circuit produces a third phase signal in response to the first and the second amplified phase signals using control logic to output the three-phase signals applied to stator coils of the motor, whereby the third phase signal has a phase difference of 120° relative to each of the first and second phase signals.

BRIEF DESCRIPTION OF THE DRAWINGS

This invention may be better understood and its object will become apparent to those skilled in the art by reference to the accompanying drawings as follows.

DESCRIPTION OF PREFERRED EMBODIMENT

Figure 1:
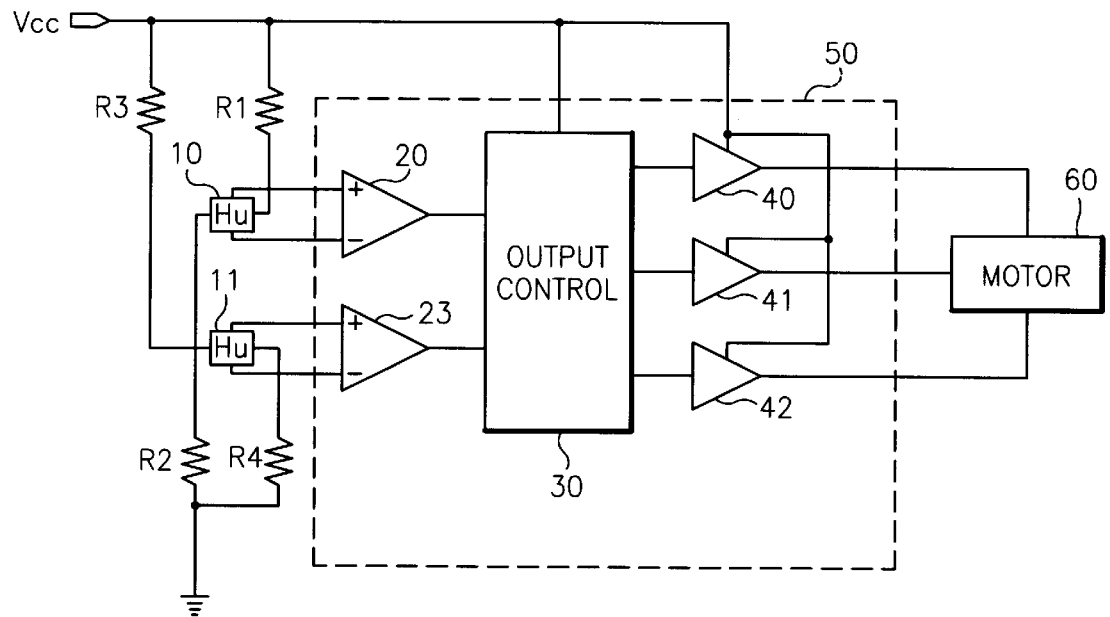
FIG. 1 is a block diagram of a conventional driver circuit for driving a three-phase motor.
Figure 2:
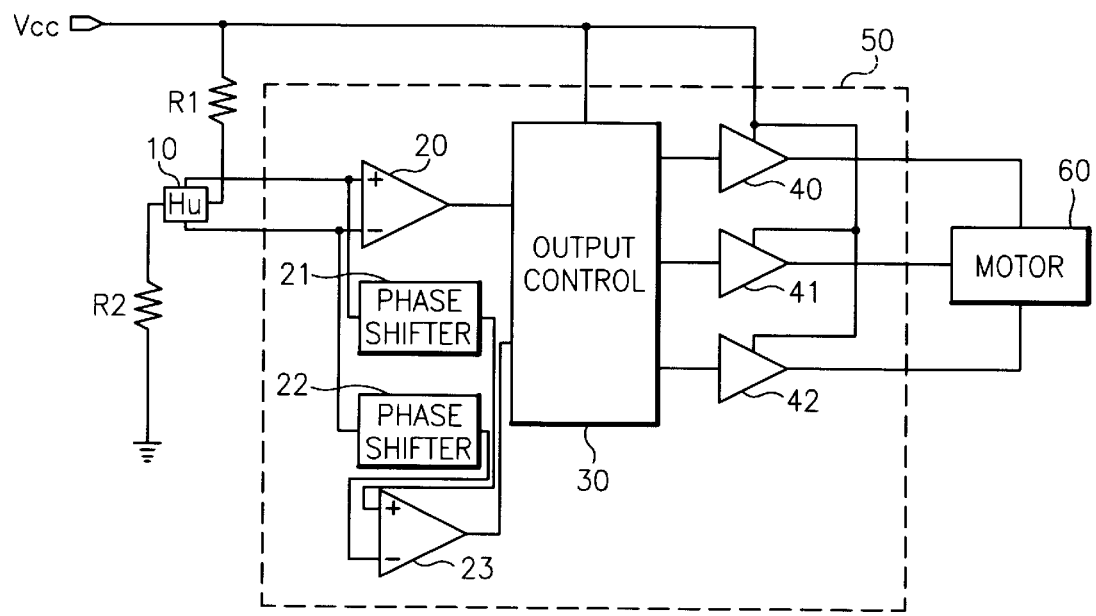
FIG. 2 is a circuit diagram showing a driver circuit apparatus for driving a three-phase motor according to the present invention.

FIG. 2 shows a driver circuit apparatus for driving a three-phase motor according to the present invention. In FIG. 2, the same components as those in FIG. 1 are indicated by the same reference numerals.

Referring to FIG. 2, a novel driver circuit apparatus constructed in accordance with the present invention includes a magneto-sensitive element 10 for generating a U-phase signal of three-phase signals and an inverse U-phase signal which is a 180° phase-shifted signal relative to the U-phase signal, and a driver IC 50 for driving a three-phase motor 60. In the invention, a single hall device is used as the magneto-sensitive element 10. The U-phase signal and the inverse U-phase signals are generated from hall-terminals of the hall device 10 respectively. The hall device 10 is connected between two resistors R1 and R2 which are connected in series between a power source Vcc and a ground.

As shown again in FIG. 2, the driver IC 50 is provided to drive the three-phase motor 60 according to three-phase signals. These signals are generated from the driver IC 50 and applied to stator coils of the motor 60. The driver IC 50 includes an operational amplifier 20 for amplifying the U-phase signal and outputting an amplified U-phase signal; an output control 30 having two input terminals which receive two signals of the three-phase signals; three output terminals which output the three-phase signals; and three output amplifiers 40, 41 and 42 which amplify the three-phase signals respectively. The operational amplifier 20 has two input terminals, one of which receives the U-phase signal and the other receives the inverse U-phase signal.

Also, the driver IC 50 further includes a first phase shifter 21 which receives the U-phase signal from the hall device 10 and outputs a second phase signal (i.e., a V-phase signal) having a phase difference of 120° relative to the U-phase signal; a second phase shifter 22 which receives the inverse U-phase signal from the hall device 10 and outputs a second inverse signal (i.e., an inverse V-phase signal) having a phase difference of 120° relative to the inverse U-phase signal; and an operational amplifier 23 which receives the second and the second inverse signals from phase shifters 21,22 respectively and amplifies the second signal, thereby outputting a second amplified phase signal.

In the above construction, the U-phase signal generated from the single hall device 10 is amplified by the operational amplifier 20 and then applied to the output control 30. The U-phase signal then is phase-shifted by the phase shifter 21 to be changed into a V-phase signal. This V-phase signal has a phase difference of 120° relative to the U-phase signal. The inverse U-phase signal also is phase-shifted by the phase shifter 22 in the same way to be changed into an inverse V-phase signal. This inverse V-phase shifted signal has a phase difference of 180° relative to the V-phase signal.

The operational amplifiers 20,23 also amplify the U-phase and the V-phase signals, respectively. The U-phase and the V-phase signals that are so amplified are applied to the output control 30 to be changed into three-phase signals. The three-phase signals are respectively amplified by the output amplifier 40, 41 and 42 and applied to the stator coils of the motor 60.

Accordingly, the above described driver circuit apparatus can have a simplified construction in which a single magneto-sensitive element is embodied to detect the rotor position of a three-phase motor. Also, reliability of the motor operation can be improved because of the above simplified construction of the driver circuit, as compared with a conventional driver circuit apparatus having at least two magneto-sensitive elements.

While the present invention has been described and illustrated with reference to preferred embodiments thereof, it is to be readily understood by those skilled in the art that the present invention is not limited to the embodiments, and various changes and modifications can be made therein without departing from the spirit and scope of the invention defined in the appended claims. For instance, it is understood that V- and W-phase signals (and their inverses) can also be generated by the magneto-sensitive element 10 and manipulated according to the teachings of the invention.

What is claimed is:

1. A driver circuit apparatus for generating a three-phase signal suitable for driving a three-phase motor, said apparatus comprising:

a single magneto-sensitive element for generating a first phase signal of the three-phase signal and a first inverse phase signal which is a 180° phase-shifted signal relative to the first phase signal in response to a detected rotor position of a three-phase motor; and an integrated circuit for selectively applying a current signal to the three-phase motor in response to the first phase signal generated from the single magneto-sensitive element, said integrated circuit comprising:

a first amplifier for amplifying the first phase signal and outputting a first amplified phase signal;

a first phase shifter for receiving the first phase signal and generating a second phase signal having a phase difference of 120° relative to the first phase signal; a second phase shifter for receiving the first inverse phase signal and generating a second inverse phase signal having a phase difference of 120° relative to the first inverse phase signal;

a second amplifier for amplifying the second phase signal and outputting a second amplified phase signal; and an output control for producing a third phase signal in response to the first and the second amplified phase signals by means of a control logic thereof to produce the three-phase signal, the third phase signal having a phase difference of 120° relative to each of the first and the second phase signals.

2. The driver circuit apparatus of claim 1, wherein said magneto-sensitive element includes a hall device.

3. The driver circuit apparatus of claim 2, wherein the generated first phase signal is a U-phase signal.

4. The driver circuit apparatus of claim 2, wherein the generated first phase signal is a V-phase signal.

5. The driver circuit apparatus of claim 2, wherein the generated first phase signal is a W-phase signal.

6. The driver circuit apparatus of claim 2 further comprising:
   a first resistor connected between the hall device and a power source; and
   a second resistor connected between the hall device and a ground.

7. The driver circuit apparatus of claim 1, further comprising an output amplifier for amplifying the first, the second and the third phase signals, respectively, to be applied to stator coils of the three-phase motor.

8. An integrated circuit for driving a three-phase motor in response to a single signal of three-phase signals to be applied to stator coils of the motor, comprising:
   a first amplifier for amplifying the single signal as a first phase signal on the basis of a first inverse phase signal which is a 180° phase-shifted signal relative to the single signal, to output a first amplified phase signal;
   a first phase shifter for generating a second phase signal in response to the first phase signal, the second phase signal having a phase difference of 120° relative to the first phase signal.
   a second phase shifter for generating a second inverse phase signal to the first inverse phase signal, the second inverse phase signal having a phase difference of 120° relative to the first inverse phase signal;
   a second amplifier for amplifying the second phase signal on the basis of the second inverse phase signal to output a second amplified phase signal which is a 120° phase-shifted signal relative to the first amplified phase signal;
   an output control for producing a third phase signal in response to the first and the second amplified phase signals by means of a control logic thereof to output the three-phase signals applied to stator coils of the motor, the third phase signal having a phase difference of 120° relative to each of the first and the second phase signals.

9. A driver circuit apparatus for generating a three-phase signal suitable for driving a three-phase motor, said apparatus comprising:
   a single magneto-sensitive element for generating a first phase signal in response to a detected rotor position of a three-phase motor; and
   an integrated circuit for selectively applying a current signal to the three-phase motor in response to the first phase signal generated from the single magneto-sensitive element,
   said integrated circuit comprising:
      a first phase shifter for receiving the first phase signal and generating a second phase signal having a phase difference of 120° relative to the first phase signal; and
      an output control for producing a third phase signal in response to the first and the second phase signals input to the output control, said three-phase signal being produced by means of a control logic thereof, the third phase signal having a phase difference of 120° relative to each of the first and the second phase signals.

10. A method for driving a three-phase motor comprising:
    detecting a rotor position of a three-phase motor using a single magneto-sensitive element;
    generating a first phase signal from the single magneto-sensitive element and a first inverse phase signal which is a 180° phase-shifted signal relative to the first phase signal in response to the detected rotor position;
    amplifying the first phase signal and outputting a first amplified phase signal;
    phase shifting the first phase signal to a second phase signal having a phase difference of 120° relative to the first phase signal;
    phase shifting the first inverse phase signal to a second inverse phase signal having a phase difference of 120° relative to the first inverse phase signal;
    amplifying the second phase signal and outputting a second amplified phase signal;
    producing a third phase signal in response to the first and the second amplified phase signals, the third phase signal having a phase difference of 120° relative to each of the first and the second phase signals; and
    selectively applying the first, second and third phase signals to stator coils of the three-phase motor in response to the signals generated from the single magneto-sensitive element.

* * * * *